US008295894B2

(12) United States Patent
Macfarlane et al.

(10) Patent No.: US 8,295,894 B2
(45) Date of Patent: Oct. 23, 2012

(54) PORTABLE WIRELESS COMMUNICATIONS DEVICE INCLUDING PICKPOCKET NOTIFICATION AND RELATED METHODS

(75) Inventors: David V. Macfarlane, Waterloo (CA); Neil Adams, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 850 days.

(21) Appl. No.: 11/192,593

(22) Filed: Jul. 29, 2005

(65) Prior Publication Data
US 2007/0026906 A1 Feb. 1, 2007

(51) Int. Cl.
| H04M 1/00 | (2006.01) |
| H04M 1/66 | (2006.01) |
| H04M 1/68 | (2006.01) |
| H04M 3/16 | (2006.01) |
| G05B 19/00 | (2006.01) |
| G05B 23/00 | (2006.01) |
| G06F 7/00 | (2006.01) |
| G06F 7/04 | (2006.01) |
| G06F 11/30 | (2006.01) |
| G06F 12/14 | (2006.01) |
| G06F 17/30 | (2006.01) |
| G06F 7/16 | (2006.01) |
| G08B 29/00 | (2006.01) |
| G08C 19/00 | (2006.01) |
| H04B 1/00 | (2006.01) |
| H04B 3/00 | (2006.01) |
| H04Q 1/00 | (2006.01) |
| H04Q 9/00 | (2006.01) |

(52) U.S. Cl. .................. 455/575.1; 455/411; 455/550.1; 455/575.6; 340/5.8; 340/539.23; 340/583; 713/193; 726/27

(58) Field of Classification Search ................. 455/41.2, 455/411, 456, 550.1, 574, 575.1, 410, 420, 455/90.1–90.3, 348, 346, 351, 438; 340/539.23, 340/571, 686.1, 7.63, 455, 5.74, 539.11, 340/561, 546, 545.4, 551, 562, 563, 568.1, 340/568.6–568.7, 572.1, 573.1, 539.1, 539.8, 340/539.25, 539.26, 539.32, 57, 1; 726/27, 726/35, 2, 22; 379/455; 705/59; 713/165, 713/150, 176, 193; 200/600; 341/33
See application file for complete search history.

(56) References Cited

U.S. PATENT DOCUMENTS
5,610,979 A  3/1997  Yu .................................. 379/455
(Continued)

FOREIGN PATENT DOCUMENTS
EP  1411709  4/2004
(Continued)

Primary Examiner — Matthew Anderson
Assistant Examiner — Paul P Tran
(74) Attorney, Agent, or Firm — Allen, Dyer, Doppelt, Milbrath & Gilchrist, P.A. Attorneys at Law

(57) ABSTRACT

A portable wireless communications device to be carried by a holster includes a portable housing carrying a wireless transceiver, a holster sensor, a local alert indicator, a user authentication input device, and a controller. The controller may store data and is connected to the wireless transceiver, the holster sensor, the local alert indicator, and the user authentication input device. The controller may be switchable to a pickpocket mode for activating the local alert indicator, wirelessly sending at least one remote alert message, and rendering unusable at least a portion of the stored data upon removal from the holster unless a user authentication is input before expiration of a predetermined time.

12 Claims, 4 Drawing Sheets

U.S. PATENT DOCUMENTS

| | | | |
|---|---|---|---|
| 5,796,338 A | 8/1998 | Mardirossian | 340/568 |
| 6,154,665 A | 11/2000 | Briffett et al. | 455/574 |
| 6,502,727 B1 | 1/2003 | Decoteau | 224/162 |
| 6,674,358 B1 | 1/2004 | Tinsley | 340/7.63 |
| 6,831,567 B2 | 12/2004 | Liao | 340/686.1 |
| 6,836,212 B2 | 12/2004 | Sawinski | 340/539.23 |
| 7,327,255 B2 * | 2/2008 | Kassiedass | 340/568.1 |
| 7,333,776 B1 * | 2/2008 | York | 455/90.1 |
| 7,421,589 B2 * | 9/2008 | Williams et al. | 713/193 |
| 7,715,830 B2 * | 5/2010 | Cocita | 455/418 |
| 2003/0043037 A1 * | 3/2003 | Lay | 340/568.1 |
| 2003/0065934 A1 | 4/2003 | Angelo et al. | 713/200 |
| 2003/0073448 A1 | 4/2003 | Ozeki et al. | 455/456 |
| 2004/0070499 A1 | 4/2004 | Sawinski | 340/568.1 |
| 2004/0117651 A1 * | 6/2004 | Little et al. | 713/200 |
| 2004/0224665 A1 | 11/2004 | Kokubo | 455/411 |
| 2005/0046580 A1 | 3/2005 | Miranda-Knapp et al. | 340/686.1 |
| 2005/0191988 A1 * | 9/2005 | Thornton et al. | 455/404.1 |
| 2005/0221799 A1 * | 10/2005 | Tervo et al. | 455/411 |
| 2005/0282576 A1 * | 12/2005 | Delker et al. | 455/550.1 |
| 2006/0022822 A1 * | 2/2006 | Wong et al. | 340/568.1 |

FOREIGN PATENT DOCUMENTS

GB 2391430 2/2004

* cited by examiner

PORTABLE WIRELESS COMMUNICATIONS DEVICE INCLUDING PICKPOCKET NOTIFICATION AND RELATED METHODS

FIELD OF THE INVENTION

The invention relates to the field of wireless communication devices, and, more particularly, to portable wireless communication devices and related methods.

BACKGROUND OF THE INVENTION

A portable wireless communication device such as a cell phone, personal digital assistant, wireless email device, pager, and the like may be carried by an owner/user on their person. A typical method for carrying such a portable device is for the owner to wear a holster on which the portable device is quick-release connected. The quick-release connection may permit the owner to easily remove the portable device from the holster. A disadvantage of the quick-release connection is that the portable device may come out of the holster through inadvertent contact with an object, or by an unauthorized person removing the portable device. In both cases, this may happen without the knowledge of the owner of the portable device. Such a loss may create numerous problems for the owner of the portable device.

For instance, the owner may have to obtain and pay for a replacement portable device. The owner may have to cancel any services enabled by the portable device, such as phone service, to prevent unauthorized charges to the owner. Additionally, there are potential problems with preventing the disclosure of the information that was stored on the portable device. For instance, portable devices have become indispensable work tools and therefore the portable device may have sensitive business information whose dissemination needs to be controlled.

Consequently, a number of schemes have been developed to address some of these potential problems. For example, U.S. Pat. No. 6,674,358 to Tinsley discloses a holstered portable device that includes a sensor for determining if the portable device has been removed from the holster. If the portable device has been removed from the holster, an alert may be sounded and the alert may be deactivated by the entry of a series of keystrokes on the portable device. Similarly, U.S. Pat. No. 6,836,212 to Sawinski also discloses a system that alerts a user when a portable device is removed from a holster. It further discloses that the portable device may be instructed by the alert program to transmit a stored message over a wireless channel to a user-identified target such as another wireless device carried by the user.

U.S. Pat. No. 5,610,979 to Yu discloses a system that that alerts a user when a portable device is removed from a holster. The holster has a contact interface that mates with a contact interface on the portable device, and when the contact between the two contact interfaces are interrupted, an alert is generated for the user.

U.S. Pat. No. 6,831,567 to Liao also discloses a holster for carrying a portable device. The holster has a receiver tuned to a circuit on the portable device, and when the portable device exceeds a certain distance from the holster, an alert is generated for the user.

DETAILED DESCRIPTION OF THE PREFERRED EMBODIMENTS

In view of the foregoing background, it is therefore an object of the invention to provide a portable device that can sense its removal from a holster and take appropriate steps if the removal was unacknowledged by the owner of the portable device.

This and other objects, features, and advantages in accordance with the invention are provided by a portable wireless communications device that may be carried by a holster and may be removable therefrom. The portable wireless communications device may include a portable housing carrying a wireless transceiver, a holster sensor, a local alert indicator, a user authentication input device, and a controller. The controller may store data and may be connected to the wireless transceiver, the holster sensor, the local alert indicator, and the user authentication input device. The controller may be switchable to a pickpocket mode for activating the local alert indicator, wirelessly sending at least one remote alert message, and rendering unusable at least a portion of the stored data upon removal from the holster unless a user authentication is input before expiration of a predetermined time. Accordingly, a portable device is provided that can sense its removal from a holster and take appropriate steps if the removal was unacknowledged by the owner of the portable device.

The local alert indicator may comprise a visible, audible, and/or vibratory alert indicator. The user authentication input device may comprise an input keypad. The holster sensor may comprise a magnetic, electrical, optical, and/or mechanical holster sensor. The stored data may comprise stored user data and/or stored application data. The remote alert message may comprise an email remote alert message, short messenger service remote alert message, and/or a telephone call.

A method aspect of the invention is for operating a portable wireless communications device. The method may include using the controller, when in a pickpocket mode, to activate the local alert indicator upon removal of the portable housing from a holster as determined based upon the holster sensor, to wirelessly send at least one remote alert message using the wireless transceiver, and to render unusable at least a portion of the stored data unless a user authentication is input into the user authentication input device before expiration of a predetermined time.

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
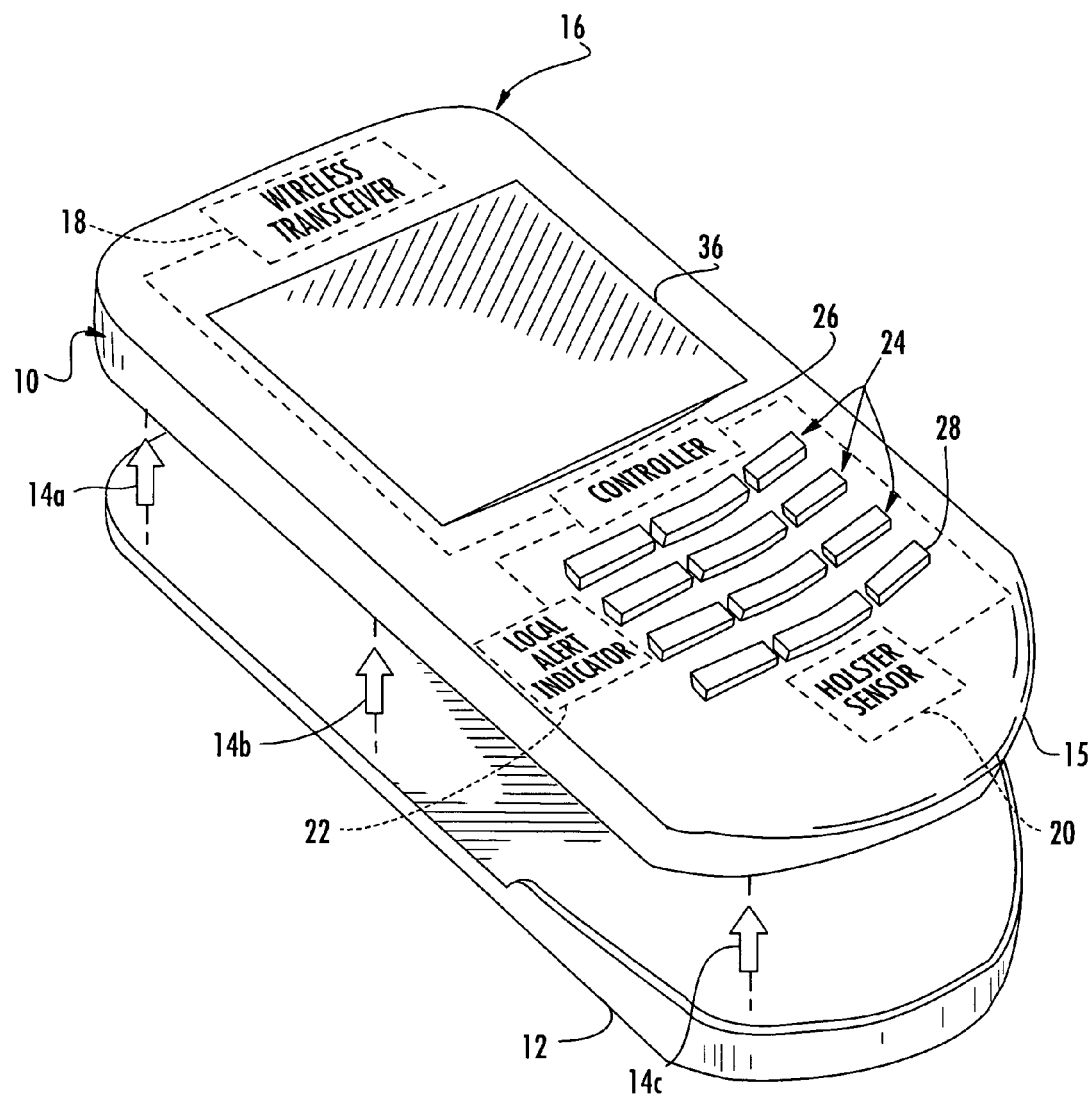
FIG. 1 is a schematic diagram of a portable wireless communications device in accordance with the invention.
Figure 2:
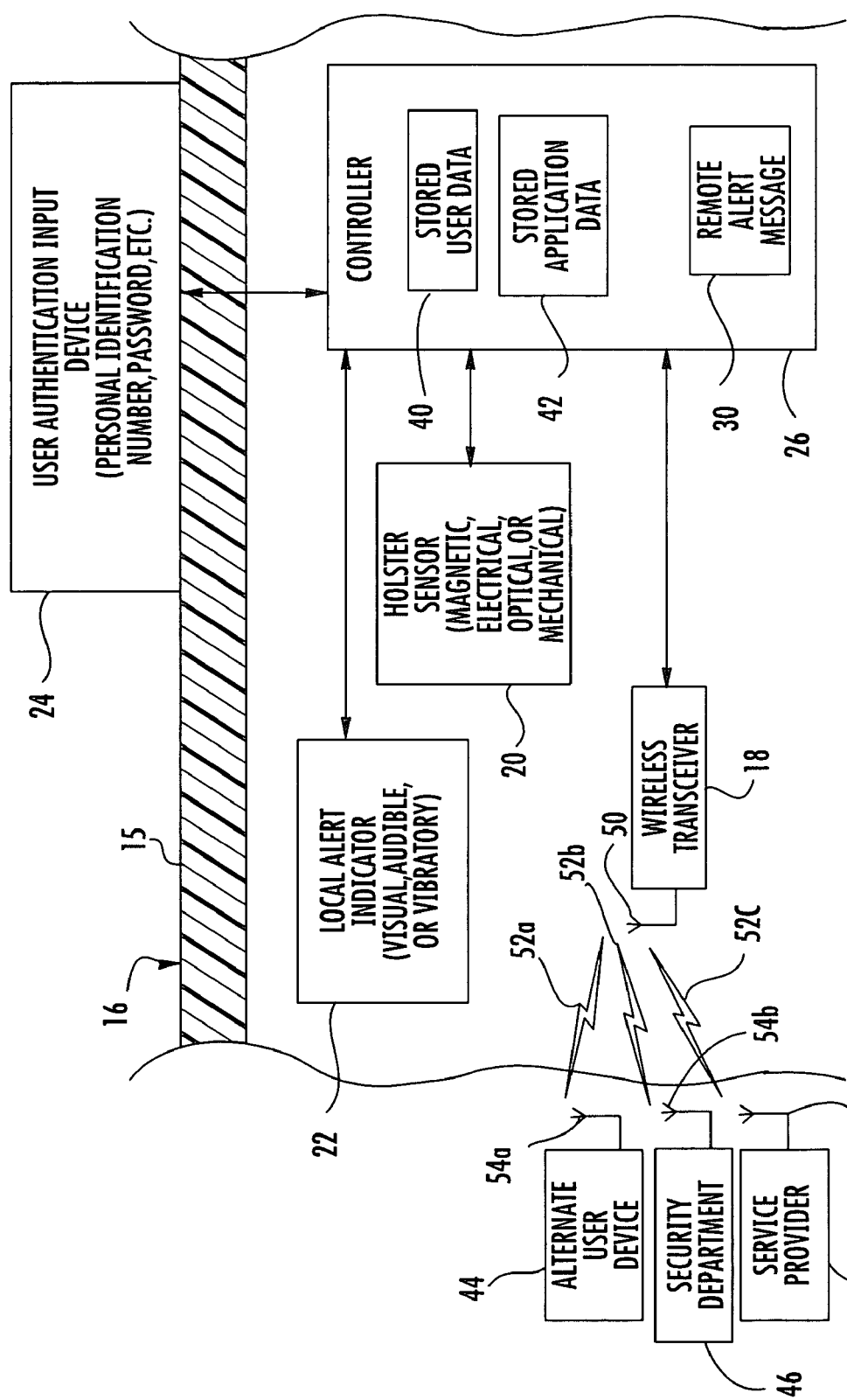
FIG. 2 is a more detailed schematic diagram, partially in section, of a portion of the portable device as shown in FIG. 1.

Referring initially to FIGS. 1 and 2, a portable wireless communications device 10 in accordance with the invention is now described. The portable device 10 is shown as being removed from a holster 12 following the path indicated by removal arrows 14a-14c. The portable device 10 is readily removed and inserted into the holster 12 to facilitate convenient transport and access of the portable device by the user. As will be appreciated by those of skill in the art, the holster 12 is traditionally attached to a user's belt, trouser waistband, pocket, or the like, and the holster may come in many alternate configurations such as a partial sleeve that encloses at least a portion of the portable device 10.

The portable device 10 illustratively includes a portable housing 16 carrying a wireless transceiver 18, a holster sensor 20, a local alert indicator 22, a user authentication input device 24, and a controller 26. The controller 26 may store data, and is connected to the wireless transceiver 18, the holster sensor 20, the local alert indicator 22, and the user authentication input device 24, for example. The controller 26 is switchable to a pickpocket mode 28. In the pickpocket mode 28, the controller 26 will activate the local alert indicator 22, wirelessly send at least one remote alert message 30, and render unusable at least a portion of the stored data upon removal from the holster 12 unless a user authentication is input before expiration of a predetermined time. Considered in other terms, the portable device 10 can sense its removal from a holster 12 and take appropriate steps if the removal was unacknowledged by the owner of the portable device as would occur, for example, if a pickpocket surreptitiously removed the device from the user's holster in a crowded environment, such as an airport.

The controller 26 may wirelessly send a plurality of remote alert messages 30, for example. The user authentication may be a Personal Identification Number (PIN) or a password, or the like. The authentication input device 24 may comprise an input keypad 38, for example, which may be used to enter the PIN and/or password.

As will be appreciated by those of skill in the art, the user authentication input device 24 may further or alternately include other input devices such as biometric readers. The authentication input device 24 is illustratively shown as carried by an outer surface 15 of the portable housing 16. The authentication input device 24 may alternately or additionally be carried within the portable housing 16 as will be appreciated by those of skill in the art.

The local alert indicator 22 may comprise a visible, audible, and/or vibratory alert indicator, for example. As will be appreciated by those of skill in the art, the visible indicator may be the flashing of one or more lights, not shown, or flashing of the display 36. The audible local alert indicator may be a series of tones generated over a speaker, not shown, carried by the portable housing 16. The local alert indicator 22 could also be vibration generated by a vibration unit, not shown, carried the portable housing 16.

The holster sensor 20 may comprise a magnetic, electrical, optical, and/or mechanical holster sensor as will be appreciated by those of skill in the art. The holster sensor 20 detects changes in a monitored parameter, which the controller 26 uses to determine if the portable device 10 is carried by the holster 12, or if the portable device 10 has been removed from the holster 12.

The controller 26 may store data, such as stored user data 40 and/or stored application data 42, for example. User data 40 may include personal information, such as personal financial information, work related information, or the like entered into the portable device 10. Application data 42 may include software loaded onto the portable device 10.

The controller 26 may generate or store the remote alert message 30 that, in turn, may comprise an email remote alert message, a short messenger service remote alert message, a telephone call message, and the like. The remote message is sent over communication links 52a-52c using wireless transceiver antenna 50 to respective remote antennas 54a-54c as will be appreciated by those of skill in the art. The remote alert message 30 may be sent to an alternate user device 44 such as the user's notebook computer. Alternately or additionally, the remote alert message 30 may be sent to a security department 46 such as the user's information technology department at work or an identity thief protection organization of which the user is a member. Alternately or additionally, the remote alert message 30 may be sent to a service provider 48 such as the user's phone service. Of course, in other embodiments only a single remote alert message 30 may be sent.

A method aspect of the invention is for operating the portable device 10. The portable device 10 may comprise a portable housing 16 carrying a wireless transceiver 18, a holster sensor 20, a local alert indicator 22, a user authentication input device 24, and a controller 26 for storing data. The controller 26 may be connected to the wireless transceiver 18, the holster sensor 20, the local alert indicator 22, and the user authentication input device 24.

Figure 3:
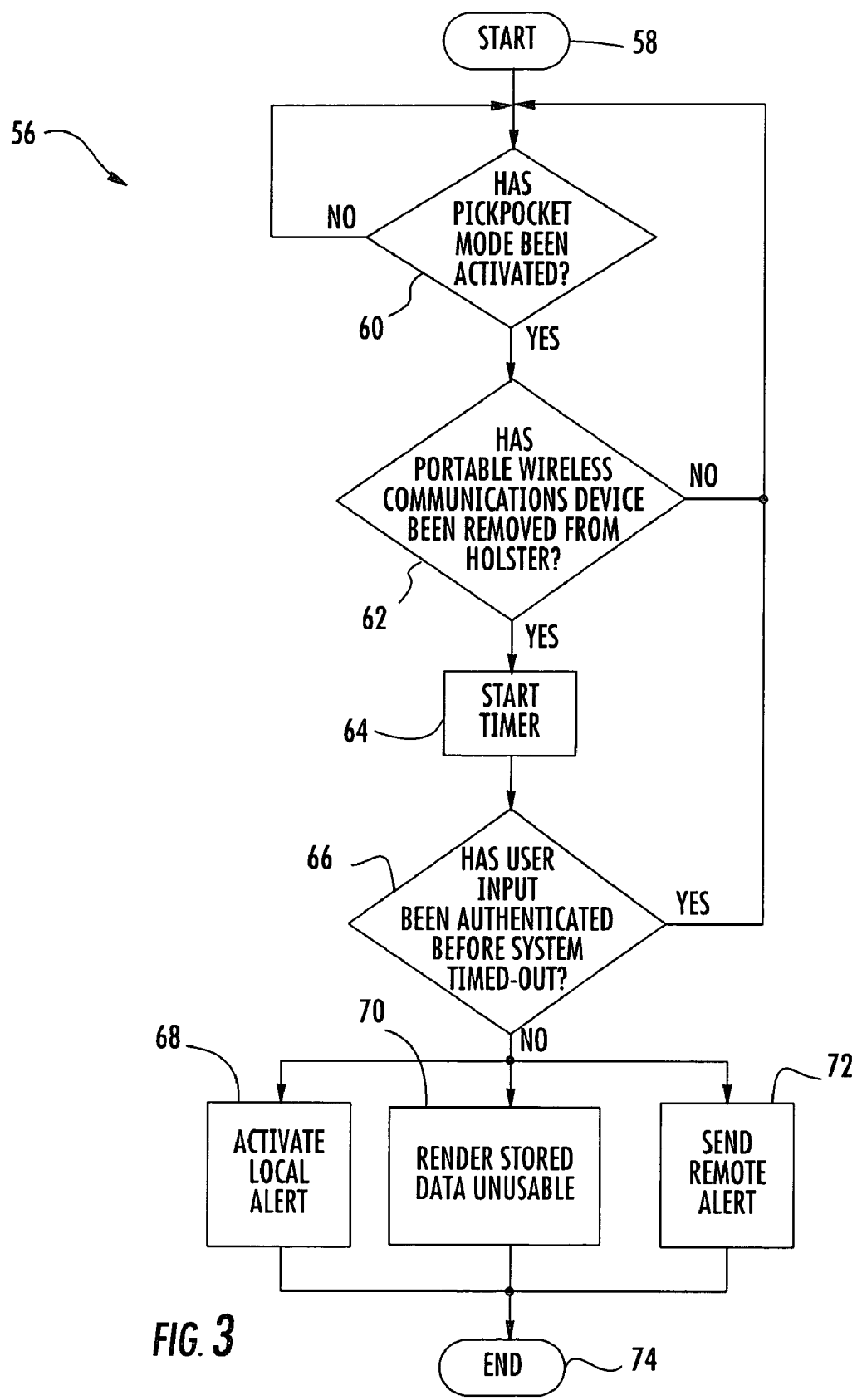
FIG. 3 is a flow chart illustrating a method according to the invention.

The method is now described with reference to the flowchart 56 of FIG. 3. The method begins at Block 58 where the controller 26 checks if the pickpocket mode 28 has been activated at Block 60. The pickpocket mode 28 may be selected by the user entering an appropriate code, for example, and then placing the portable device 10 into the holster 12. If the pickpocket mode 28 has not been entered, the controller 26 continues to monitor the portable device 10. If the pickpocket mode 28 has been entered, the controller 26 determines if the portable device 10 has been removed from the holster 12 at Block 62.

If the device 10 has not been removed from the holster 12, the controller 26 continues to monitor the holster sensor 20. If the portable device 10 has been removed from the holster 12, the controller 26 starts a timer at Block 64. The controller 26 then determines if a user input has been authenticated before the system timed-out at Block 66. The predetermined time may be user selectable, such as in a range of several seconds up to several minutes, for example.

If the user input has been authenticated before the system timed-out, the controller 26 continues to monitor the portable device 10. If the user input has not been authenticated before the system timed-out, the controller activates a local alert at Block 68, renders user data unusable at Block 70, and sends at least one remote alert at Block 72. The method ends at Block 74.

Another example of a handheld mobile wireless communications device 1000 that may be used in accordance the present invention is further described with reference to FIG. 4. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 4:
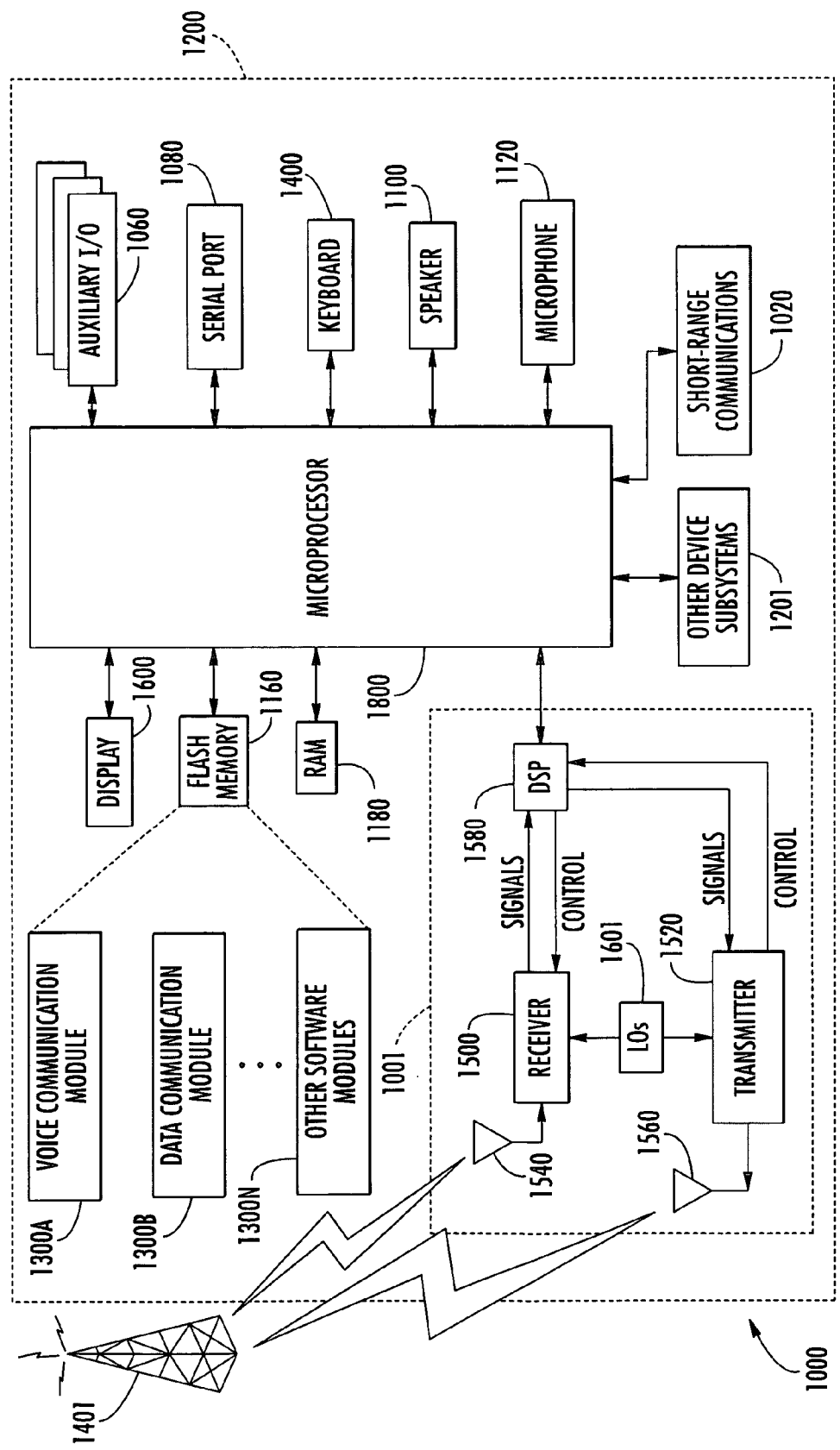
FIG. 4 is a more detailed schematic block diagram of an alternate embodiment of a portable wireless communications device according to the invention.

In addition to the processing device 1800, other parts of the mobile device 1000 are shown schematically in FIG. 4. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A portable wireless communications device to be carried by a holster and being removable therefrom, the portable wireless communications device comprising:
 a portable housing;
 a wireless transceiver carried by said portable housing;
 a holster sensor carried by said portable housing;
 a local alert indicator carried by said portable housing;
 a biometric sensor carried by said portable housing; and a controller carried by said portable housing and connected to said wireless transceiver, said holster sensor, said local alert indicator, and said biometric sensor;

said controller storing application data and user data and being switchable to a pickpocket mode based upon input from said biometric sensor;

said controller cooperating with said holster sensor for detecting, in the pickpocket mode, the removal of said portable housing from said holster;

said controller, in response to detecting the removal of said portable housing from said holster, activating a timer and determining whether a user biometric authentication is input via said biometric sensor before expiration of the timer;

said controller, upon expiration of the timer, activating said local alert indicator, wirelessly sending at least one remote alert message via said wireless transceiver, and rendering unusable at least a portion of the stored data upon removal from the holster unless a user biometric authentication is input before the expiration of the timer irrespective of a number of attempts to input the biometric user authentication.

2. The portable wireless communications device according to claim 1 wherein said local alert indicator comprises at least one of a visible, audible, or vibratory local alert indicator.

3. The portable wireless communications device according to claim 1 further comprising an input keypad; and wherein said controller is configured to be switchable to the pickpocket mode also based upon said input keypad.

4. The portable wireless communications device according to claim 1 wherein said holster sensor comprises at least one of a magnetic, electrical, optical, or mechanical holster sensor.

5. The portable wireless communications device according to claim 1 wherein the at least one remote alert message comprises at least one of an email remote alert message, short messenger service remote alert message, or a telephone call.

6. The portable wireless communications device according to claim 5 wherein the at least one remote alert message comprises a plurality thereof.

7. A method for operating a portable wireless communications device including a holster, a portable housing carrying a wireless transceiver, a holster sensor, a local alert indicator, and a biometric sensor coupled to a controller for storing application data and user data, the method comprising:

switching the controller to a pickpocket mode based upon input to the biometric sensor;

using the controller, when in the pickpocket mode, to
cooperate with the holster sensor to detect a removal of the portable housing from the holster,
activate a timer in response to detecting the removal of the portable housing from the holster, and
determine whether a user biometric authentication is input via the biometric sensor before the expiration of the timer; and using the controller, upon the expiration of the timer to activate the local alert indicator upon the removal of the portable housing from the holster as determined based upon the holster sensor, to wirelessly send at least one remote alert message using the wireless transceiver, and to render unusable the stored user data unless a user biometric authentication is input into the biometric sensor before the expiration of the timer irrespective of a number of attempts to input the biometric user authentication.

8. The method according to claim 7 wherein the local alert indicator comprises at least one of a visible, audible, or vibratory local alert indicator.

9. The method according to claim 7 wherein the portable wireless communications device includes an input keypad; and wherein switching the controller to the pickpocket mode is also based upon input to the input keypad.

10. The method according to claim 7 wherein the holster sensor comprises at least one of a magnetic, electrical, optical, or mechanical holster sensor.

11. The method according to claim 7 wherein the at least one remote alert message comprises at least one of an email remote alert message, short messenger service remote alert message, or a telephone call.

12. The method according to claim 11 wherein the at least one remote alert message comprises a plurality thereof.

* * * * *